United States Patent
Kim et al.

(10) Patent No.: US 7,981,495 B2
(45) Date of Patent: Jul. 19, 2011

(54) MATERIALS METHODOLOGY TO IMPROVE THE DELAMINATION STRENGTH OF LAMINAR COMPOSITES

(75) Inventors: Yong K. Kim, North Dartmouth, MA (US); Armand F. Lewis, Mattapoisett, MA (US); John M. Rice, Portsmouth, RI (US)

(73) Assignees: Invensys Systems, Inc., Foxboro, MA (US); University of Massachusetts, Worcester, MA (US)

( * ) Notice: Subject to any disclaimer, the term of this patent is extended or adjusted under 35 U.S.C. 154(b) by 0 days.

(21) Appl. No.: 11/931,416

(22) Filed: Oct. 31, 2007

(65) Prior Publication Data

US 2008/0274326 A1    Nov. 6, 2008

Related U.S. Application Data

(60) Provisional application No. 60/863,680, filed on Oct. 31, 2006.

(51) Int. Cl.
*B32B 5/08* (2006.01)
*B32B 5/12* (2006.01)

(52) U.S. Cl. ............... 428/86; 428/119; 428/90

(58) Field of Classification Search ............ 428/86, 428/105, 113, 119
See application file for complete search history.

(56) References Cited

U.S. PATENT DOCUMENTS

| | | | | |
|---|---|---|---|---|
| 2,494,848 A | * | 1/1950 | Whitelegg | 428/86 |
| 3,128,544 A | * | 4/1964 | Allingham | 419/9 |
| 3,328,218 A | * | 6/1967 | Noyes | 156/166 |
| 3,518,154 A | | 6/1970 | Broadhurst | |
| 3,591,444 A | * | 7/1971 | Hoppe | 428/86 |
| 3,808,087 A | * | 4/1974 | Milewski et al. | 428/86 |
| 3,849,236 A | | 11/1974 | Bourdon | |
| 3,884,169 A | * | 5/1975 | Hoppe et al. | 112/420 |
| 3,895,158 A | | 7/1975 | Gause et al. | |
| 3,900,650 A | * | 8/1975 | Sedore | 428/86 |
| 3,900,651 A | * | 8/1975 | Hoppe et al. | 428/86 |
| 3,935,370 A | * | 1/1976 | Marti | 428/394 |
| 4,170,677 A | * | 10/1979 | Hutcheson | 428/119 |
| 4,560,603 A | * | 12/1985 | Giacomel | 428/86 |
| 4,734,307 A | | 3/1988 | Thorsrud | |
| 4,808,461 A | * | 2/1989 | Boyce et al. | 428/119 |
| 4,828,897 A | * | 5/1989 | Staneluis et al. | 428/71 |
| 5,466,506 A | * | 11/1995 | Freitas et al. | 428/105 |
| 5,733,404 A | * | 3/1998 | Freitas et al. | 156/285 |
| 5,741,574 A | * | 4/1998 | Boyce et al. | 428/119 |

(Continued)

OTHER PUBLICATIONS

Kim et al., "Fracture Toughness of Flock Fiber Reinforced Layer Composites," Proc. of 1st Industrial Simulation Conf. 2003, pp. 477-482 Jun. 9-11, UPV, Valencia, Spain (2003).

(Continued)

*Primary Examiner* — Cheryl Juska
(74) *Attorney, Agent, or Firm* — Nutter McClennen & Fish LLP; William C. Geary III

(57) ABSTRACT

Fiber based z-directional reinforced composites having enhanced inter-laminar strength, impact toughness, transmission properties (electrical and thermal conduction) and coefficient of thermal expansion are provided. The composites include at least two substrates separated by a reinforcement zone that includes a plurality of fibers disposed in a binder resin. At least some, and in one embodiment, a majority, of the fibers are oriented so as to be substantially perpendicular to the substrates. Multi-layered composites having more than two substrate layers can also be formed. Methods for forming such composites are also provided.

15 Claims, 12 Drawing Sheets

U.S. PATENT DOCUMENTS

| | | | |
|---|---|---|---|
| 5,869,165 A * | 2/1999 | Rorabaugh et al. | 428/105 |
| 5,879,492 A * | 3/1999 | Reis et al. | 156/72 |
| 5,919,413 A * | 7/1999 | Avila | 264/249 |
| 6,436,506 B1 * | 8/2002 | Pinter et al. | 428/86 |
| 6,645,610 B1 * | 11/2003 | Reis et al. | 428/297.4 |
| 6,667,360 B1 | 12/2003 | Ng et al. | |
| 6,713,151 B1 * | 3/2004 | Dean et al. | 428/86 |
| 7,052,741 B2 * | 5/2006 | Medeiros et al. | 427/464 |
| 7,510,762 B1 * | 3/2009 | Sueoka et al. | 428/292.1 |
| 2001/0006715 A1 * | 7/2001 | Pinter et al. | 428/90 |
| 2006/0024499 A1 * | 2/2006 | Kim et al. | 428/401 |
| 2008/0160248 A1 * | 7/2008 | Jacobsen et al. | 428/113 |

OTHER PUBLICATIONS

Feng, et al., "Micromechanices of Z-Directional Micro-Fiber Reinforcement," Proc. of the Society for the Advancement of Material Process Engineering, Apr. 2006.

Hoskote, et al., "Through-Thickness Reinforcement of Laminar Composites," vol. 36, No. 3, Jul. 2004, Journal of Advanced Materials.

International Search Report for International Application No. PCT/US07/22960, Apr. 18, 2008, 2 pages.

* cited by examiner (a)                           (b)

MATERIALS METHODOLOGY TO IMPROVE THE DELAMINATION STRENGTH OF LAMINAR COMPOSITES

RELATED APPLICATION(S)

This application claims priority under 35 U.S.C. §119(e) to U.S. Provisional Patent Application Ser. No. 60/863,680, filed on Oct. 31, 2006, entitled "Fabric Based Laminar Composite and Method for Manufacture Thereof," the entirety of which is incorporated herein by reference.

STATEMENT REGARDING FEDERALLY SPONSORED RESEARCH

The United States government has certain rights to the invention pursuant to Contract No. NTC F04-MD12, Grant No. 02-07400 awarded by the U.S. Department of Commerce, NTC.

FIELD OF USE

The present disclosure relates to fabric based laminar composites showing high interlaminar strength, in particular to z-directional fiber reinforced composites.

BACKGROUND

Delamination of layered fabric-reinforced composites represents one of the most prevalent structural, life-limiting failure modes of such materials. As an example, Organic Polymer Engineering Composite ("OPEC") materials based on layered fabrics have many advantageous property and processing features. However, one structural drawback is their generally poor interlaminar shear strength. Layered OPECs have little or no fiber reinforcement in the thickness direction. Therefore, their inter-ply strength is less than their longitudinal strength which can result in poor impact and/or interlaminar flexural fatigue strength.

Various techniques have been introduced to enhance the interlaminar strength of layered composite materials. A common technique is to use a rubber-toughened matrix material resin. However, these resins are generally not thermally durable. An alternative approach is to manufacture special pre-forms using advanced textile technologies such as 3-D knitting/weaving/braiding or through-the-fabric stitching/pinning processes. However, these methods are slow, inefficient, and expensive. While fabricated pre-forms may include yarns in a z-directional orientation, these reinforcements are generally not conducive to an optimized stress distribution in the mechanically functioning structure component. Such 3-D structures are prone to stress concentrations under mechanical service leading to poor fatigue resistance. These approaches appear to work in their primary goal, but they degrade the composite's in-plane properties.

Furthermore, Kim et al., "Fracture Toughness of Flock Reinforced Layered Composites", Proceedings of $1^{st}$ Industrial Simulation Conference 2003, Jun. 9-11, UPV, Valencia, Spain, p. 477-482 (2003) and Kim et al., "Through-Thickness Reinforcement of Laminar Composites", Journal of Advanced Materials", Vol. 36, no. 3, July 2004, pp 25-31, the entirety of these references hereby incorporated herein by reference, disclose that composites reinforced with z-directional fibers appear to have the potential to exhibit improved inter-laminar strength. However, z-directional reinforcement remains highly unpredictable due to the large number of variables (e.g., fiber type, flock fiber density (the number of perpendicularly oriented flock fibers per unit area of interface between the substrates), fiber denier (mass in grams per 9000 m), fiber length, binder resin type, bonding strength between fiber and binder resin, etc.) present in such a composite. As a result, many such composites do not show improved inter-laminar shear properties and/or suffer a decrease in toughness.

Therefore, there is a need in the art for a composite showing improved characteristics such as inter-laminar shear strength and/or fracture toughness.

SUMMARY

Various embodiments of a z-directional fiber reinforced composite exhibiting enhanced properties (e.g., inter-laminar strength, toughness, etc.) and a method of fabrication thereof are provided herein. As described below, each composite includes adjacent substrates having a reinforcement zone disposed therebetween. Each reinforcement zone includes a binder resin and a plurality of z-directional fibers extending between the substrates. In fabricating the composite, variables such as the type of fibers, the flock fiber density, the dimensions and/or configuration (e.g., straight, branched, etc.) of the fibers, the orientation of the fibers in the reinforcement zone, the type of binder incorporated into the reinforcement zone, etc. can be selected, modified, and/or optimized in order to provide a desired performance or characteristic of the composite such as toughness, interlaminar strength, electrical and/or thermal conductivity, or any other desired property.

Various aspects of such a composite are provided herein. In one such aspect, the composite includes a plurality of substrates and a reinforcement zone disposed between adjacent substrates of the plurality of substrates. The reinforcement zone can include a binder resin (e.g., an epoxy resin, an unsaturated polyester resin, a vinyl ester resin, etc.) and a plurality of fibers wherein a majority of the fibers can be oriented substantially perpendicular to the substrates such that the substantially perpendicularly oriented fibers can span adjacent substrate layers and can be embedded in the adjacent substrate layers. Additionally, the fibers can be dispersed in the reinforcement zone at a desired flock fiber density.

Fibers disposed in the reinforcement zone can be disposed therein using an electrostatic fiber coating process called flocking. As described below, textile flocking can involve a process of accelerating short fibers in an electrostatic field such that they are made to impinge on a substrate surface that is coated with an uncured (liquid) or partially cured (B-staged) adhesive layer. The electric field causes these short fibers to adhere in substantially perpendicular orientation to the surface. Upon curing of the adhesive, these oriented fibers are hereby fixed in place on the surface. The fibers disposed in the reinforcement zone by any such flocking procedure can be oriented in various ways. For example, as indicated above, a majority of the fibers can be substantially perpendicular relative to the adjacent substrates. In other embodiments, the reinforcement zone can further include a plurality of fibers oriented at an angle to the substrates. In other embodiments, the fibers can be bent or crimped, include any amount of branching, etc.).

Various embodiments of the presently disclosed composite can include various types of fibers (e.g., polymer-based fibers, glass fibers, carbon fibers, natural fibers, and metal fibers) and/or fibers of various dimensions. As will be described, the parameters are dependent upon one another (e.g., a certain fiber type or type of binder resin will require a certain flock fiber density to provide a composite exhibiting a desired property) and can be optimized in light of the desired properties of the final composite. For example, the composite can include fibers having an average denier of about 1.5 to about 25. In other embodiments, the composite can include fibers having an average length in the range of about 0.5 mm to about 5 mm and/or fibers having a diameter in the range of about 7 micrometers to about 50 micrometers. Another variable which can be optimized to provide a composite having the desired properties is fiber flock density. For example, in one embodiment, the composite can include fibers being dispersed within the reinforcement zone at a flock density of about 50 fibers/mm$^2$ to about 600 fibers/mm$^2$. In other embodiments, the fibers can include a surface treatment capable of providing or enhancing some property of the fibers. For example, the surface treatment can include a surface electrical conductivity modifying agent, an adhesion promoting agent, etc. As described below, these variables can be selected in light of, for example, the type of fiber, the type of substrate, the type of binder resin, the desired composite characteristics (e.g., strength, electrical and/or thermal conductivity), etc.

In another aspect, a composite is provided which includes at least a first and second substrate layer wherein at least one of the substrates is a pre-preg having a binder resin incorporated therein. Additionally, the composite can include a plurality of fibers disposed within the binder resin of the pre-preg. Similar to above, a majority of the fibers can be oriented substantially perpendicular to the substrates such that the substantially perpendicularly oriented fibers can span the first and second substrate layers and can embed in the first and second substrate layers. In such an embodiment, the binder resin can be an epoxy such as a b-staged epoxy.

Additionally, various aspects of a method of fabricating a z-directional fiber reinforced composite are provided herein. In one such aspect, the method includes applying a binder resin to at least one side of a substrate and delivering a plurality of fibers to the substrate by a flocking procedure capable of orienting the fibers substantially perpendicular to the substrate and at a desired flock fiber density (e.g., about 50 fibers/mm$^2$ to about 600 fibers/mm$^2$) such that the fibers are embedded in the substrate and extend through the binder matrix. Various flocking procedures can be utilized by the current procedure. For example, the flocking procedure can include electrostatic flocking, applying a magnetic field to fibers including magnetic nanoparticles, etc. The method can also include fabrication of a multi-layered composite by a lay-up procedure. In other embodiments, pre-pregs can be utilized in multi-layered composite fabrication.

These and other aspects of the present disclosure are described in greater detail below.

BRIEF DESCRIPTION OF THE DRAWINGS

The presently disclosed composites and methods will be more fully understood from the following detailed description taken in conjunction with the accompanying drawings, in which.

DETAILED DESCRIPTION

Certain exemplary embodiments will now be described to provide an overall understanding of the principles of the structure, function, manufacture, and use of the composites and methods of fabrication disclosed herein. One or more examples of these embodiments are illustrated in the accompanying drawings. Those skilled in the art will understand that the composites and methods specifically described herein and illustrated in the accompanying drawings are non-limiting embodiments and that the scope of the present disclosure is defined solely by the claims. The features illustrated or described in connection with one embodiment may be combined with the features of other embodiments. Such modifications and variations are intended to be included within the scope of the present disclosure.

In general, the present disclosure provides fiber based z-directional reinforced composites specifically configured and optimized to exhibit any number of desired properties and/or characteristics. More specifically, composites are provided having single or multiple layers in which each layer can include a reinforcement zone positioned between adjacent substrates. The reinforcement zone can include a plurality of z-directional fibers dispersed within a binder resin. In one embodiment, at least some of the fibers are oriented in a direction substantially perpendicular to the substrates. As described below, the strength, performance, and properties of the composite can be optimized by selection of fiber/binder/substrate combinations and/or optimization of numerous variables. Such variables can include, for example, flock fiber density, fiber surface resistivity, ratio of fiber denier to fiber length, aspect ratio of the fibers, and bonding strength of fiber to the binder resin. Additionally, if desired, the fibers can be treated with various types of surface treatments in order to achieve the desired performance.

Figure 1:
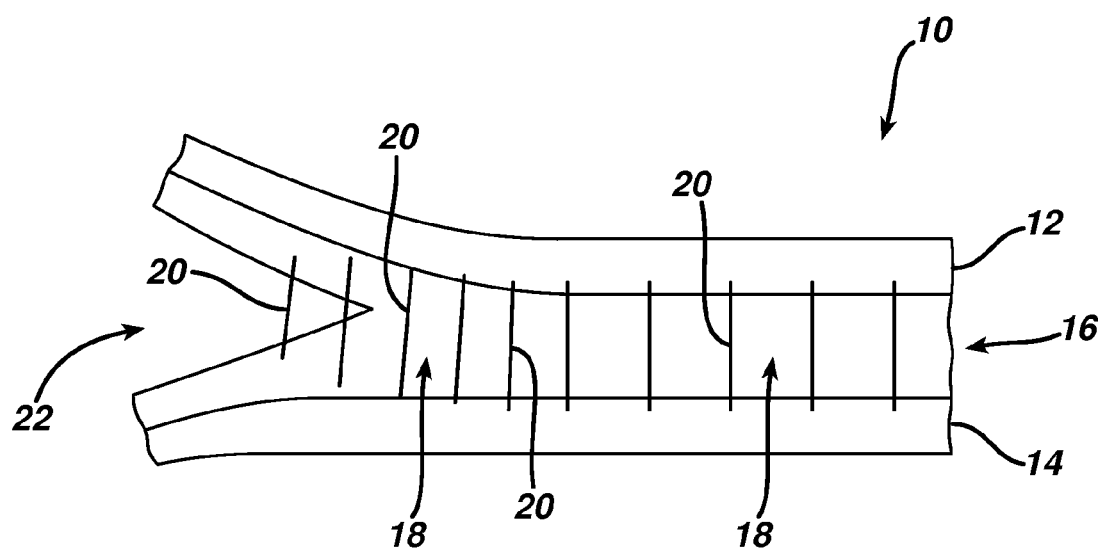
FIG. 1 schematically illustrates an exemplary embodiment of a single layer z-directional fiber based reinforced composite.

FIG. 1 illustrates an exemplary embodiment of a single layered z-directional fiber based composite 10 having a reinforcement zone 16 positioned between a first substrate 12 and a second substrate 14. The reinforcement zone 16 can include a plurality of fibers 20 dispersed within a binder resin 18 made from a material such as epoxy. As shown, at least some of the fibers 20 can be oriented substantially perpendicular to the substrates 12, 14. For example, in one exemplary embodiment, about 80% of the fibers 20 are substantially perpendicular to the substrates 14, 12. In other embodiments, about 50%, 60%, 65%, 70%, 75%, 80%, 85%, 90%, 95%, or 100% of the fibers 20 can be oriented substantially perpendicular to the substrates 12, 14. Additionally, those skilled in the art will appreciate that any or all of the fibers 20 can be substantially straight, have some degree of a curvature, and/or have a crimp. As indicated in FIG. 1, the fibers 20 can be embedded in each substrate 12, 14 by any type of process capable of providing the desired result. For example, the embedding process can include a flocking process and/or the application of pressure.

As described throughout, various components and/or characteristics of such components of the presently disclosed composites can be optimized to improve performance (e.g., prevent delamination). For illustrative purposes, FIG. 1 shows a crack 22 propagating from a distal end of the composite 10 to the proximal end. As the crack 22 attempts to grow, energy must be used to pull the fibers 20 out of the substrate(s) 12, 14 and/or the binder resin 18. Only after this initial energy barrier has been overcome may the crack 22 grow thereby causing delamination. As such, increasing the amount of energy necessary to pull the fibers 20 out of the binder matrix 18 and/or the substrate(s) 12, 14 will slow crack growth.

Various fibers are suitable for use within the reinforcement zone 16. As will be apparent to those skilled in the art, any such fiber capable of providing a composite having the desired properties is within the spirit and scope of the present disclosure. As described below, the type of fiber will impact the selection of fiber dimensions, the flock density found in a given reinforcement zone, the type of binder resin, etc. For example, the fibers 20 may be polymer-based fibers, glass fibers, carbon fibers, natural fibers, metal fibers, or any combination thereof. Exemplary polymer-based fibers include those made from polyester (e.g., polyethylene terephthalate ("PET") fiber), polybutylene terephthalate ("PBT")), nylons (nylon 6, 6-6, 3, 6-10), rayons, cellulosic fibers, polyvinylacetate fibers, polyimide and polyaramides (e.g., Nomex® or Kevlar®). Exemplary natural fibers include cotton, jute and other bast fibers. Examples of metal fibers include stainless steel fibers, titanium fibers, nickel fibers, copper fibers, brass fibers, bronze fibers, or any such alloys. In one embodiment, the fibers are nanostructures. In some embodiments, such nanostructures can include a magnetic material (e.g., nickel, cobalt-nickel, etc.) capable of responding to a magnetic field.

As will be appreciated by those skilled in the art, the fibers can have a wide range of dimensions. However, as indicated above, careful selection and optimization of such dimensions in relation to various other variables (e.g., type of fiber, type of binder resin, type of substrate, etc.) can provide a desired range of properties for a resulting composite. As described below, in exemplary embodiments, the fibers can have a length to denier ratio (measured as length to diameter ratio for certain fibers) in the range of about 1 to about 10. Exemplary fibers have an average denier in the range of about 0.2 to about 25 and an average length in the range of about 0.5 mm to about 5 mm.

In some embodiments, the fibers can be subjected to a surface treatment thereby enhancing the performance of the composite. As will be apparent to those skilled in the art, any surface treatment capable of modifying the characteristics of the fiber and/or composite (e.g., interaction of the fibers with the binder resin) is within the spirit and scope of the present disclosure. For example, the surface treatment can include a surface electrical conductivity modifying agent and/or an adhesion promoting/degrading agent. The surface electrical conductivity modifying agents can be used as fiber surface activity agents that enhance the flockability of the fibers. Examples of such electrical activity agents include quaternary ammonium and poly-tannic acid compounds, metallic ionic compounds, and carbon black. These surface agents serve as humectants and ionic conduction compounds, which absorb moisture for changing the electrical conductivity of the flock fiber's surface thereby effecting the flock "activity" of the fiber. These humectant surface chemicals may assist in the electro-coating or flock processing of these z-direction reinforcement fibers.

As indicated above, the surface treatment agent can also include an adhesion promoting agent configured to increase the bonding strength between the fibers and binder resin (e.g., epoxy resin). It will be apparent to those skilled in the art that a wide range of such adhesion promoting agents are within the spirit and scope of the present disclosure. For example, the adhesion promoting agent can include strong oxidizing acids for carbon fibers, and coupling agents for specific resins such as epoxy functional silane compounds. Adhesion degrading agents can be used when it is desirable to reduce the fiber/binder matrix adhesion strengths. For this purpose, fluorocarbon based surface energy reducing agents can be used. Again, those skilled in the art will appreciate that a wide range of such adhesion degrading agents are within the spirit and scope of the present disclosure.

The substrates 12, 14 can be formed from a wide range of materials. By way of example, the substrate can be formed from a unidirectional filament sheet, a woven fabric, glass fiber, carbon and/or any other type of advanced fiber. In some embodiments, the substrate may be formed from a pre-impregnated composite fiber ("pre-pregs"). Pre-pregs typically take the form of woven or uni-directional fibers that are bound in a matrix material (e.g., a b-staged resin matrix material). Pre-pregs are typically stored under refrigerated, frozen conditions at about −20° C. Storing these pre-pregs under cold conditions extends their storage-to-processing use time. When ready to use, the pre-pregs are removed from the freezer, brought to room temperature (with care being taken so that moisture does not condense on the pre-pregs's surface—to avoid such condensation, the pre-pregs should be wrapped in an aluminum foil (or the like) while it is warming to room temperature), manipulated into the desired laminar structure, and finally cured in a forming press or vacuum bag under heat. The curing agents in these matrix resins are commonly activated by heat. An exemplary pre-preg is Cycom 934, available from Cytec Industries (Greenville, Tex.).

An advantage of using a pre-preg substrate is that fibers may be flocked directly onto the pre-preg without the addition of a binder resin. This is possible because the pre-preg includes a "b-staged" epoxy capable of engaging the fibers. Typically, the pre-preg is heated to render the resin matrix of the pre-preg more fluid (less viscous) so the flock fibers can better penetrate and embed themselves in the pre-preg. In one embodiment, both sides of the pre-preg may be flocked and placed between adjacent substrates. Depending upon the laminar configuration desired, the adjacent substrates may include, for example, a polyethylene/polyethyleneteterfluoride ("PTFE") release film, an adhesional pre-preg, a resin impregnated fabric, or a sheet molding compound ("SMC").

The binder resin 18 of the composite 10 can include any of a number of materials which exhibit adhesive properties. For example, the binder resin 18 can be an epoxy resin, an unsaturated polyester resin, and/or a vinyl ester resin. In an exemplary embodiment, the binder resin is an epoxy resin. A useful epoxy resin can include about 100 parts Epon 826 (Shell Chemical Co.) mixed with about 26 parts of Epicure 3223 curing agent (Shell Chemical Co.). In another embodiment, the binder resin is Cycom 997 resin (commercially available from Cytech Industries). Other useful epoxy resins include amine cured (liquid) epoxy resins, Dicy cured epoxy resins, and anhydride cured (liquid) epoxy resins.

Figure 2:
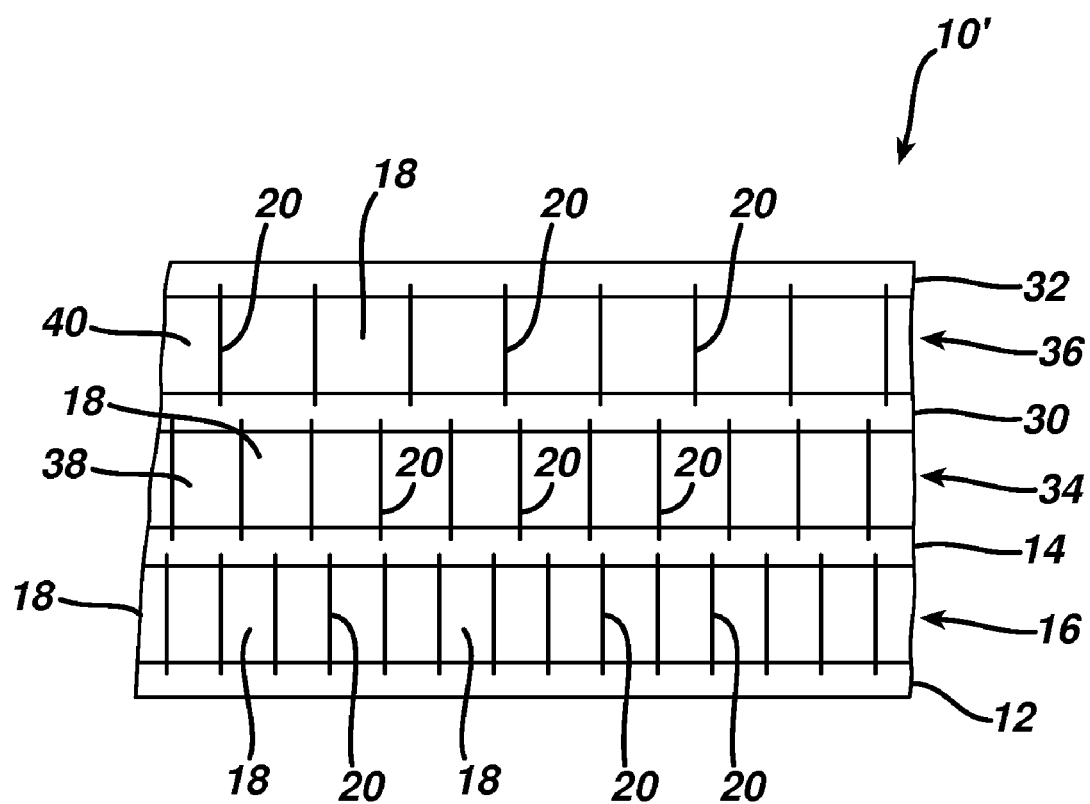
FIG. 2 schematically illustrates an exemplary embodiment of a multi-layered z-directional fiber based reinforced composite.

As noted above, the presently disclosed composites can also include multi-layered composites. FIG. 2 illustrates an exemplary embodiment of a multi-layered composite 10' having substrates 12, 14, 30, 32, each separated by a reinforcement zone 16, 34, 36. As illustrated, first and second substrates 12, 14 can be separated by a first reinforcement zone 16, second and third substrates 14, 30 can be separated by a second reinforcement zone 34, and third and fourth substrates 30, 32 can be separated by a third reinforcement zone 36. Each reinforcement zone 16, 34, 36, as noted above, can include a plurality of fibers 20 disposed within a binder resin matrix 18 such that the fibers 20 are oriented substantially perpendicular to their corresponding substrate layers 12, 14, 30, 32. Although the multi-layered composite 10' is shown to include four substrate layers and three reinforcement zones, those skilled in the art will appreciate that the multi-layered composite 10' can include any desired number of layers. Additionally, such multi-layered composites can also include pre-preg(s). In some embodiments, an outer surface of the pre-preg can be coated with an epoxy coating (e.g., an epoxy coating having a thickness of about 0.001 inches to about 0.008 inches) before the pre-preg is layered onto a flock covered ply. Such fabrication procedures will be further described below.

Such multi-layered composites 10' can use a single type of binder resin or different types of binder resin. Additionally, multi-layered composites 10' may use a single type of substrate or various types of substrates formed of different materials. Likewise, various types of fibers or a single fiber-type may be used in a multi-layered composite 10'.

In an alternative embodiment, fibers can be arranged so they penetrate through both sides of a carrier substrate (i.e., pass through the carrier substrate). This z-direction veil or scrim substrate can then be used as an interply layer between adjacent substrates or pre-pregs. The carrier layer imparts the z-directional reinforcement in the laminar composite.

Figure 3:
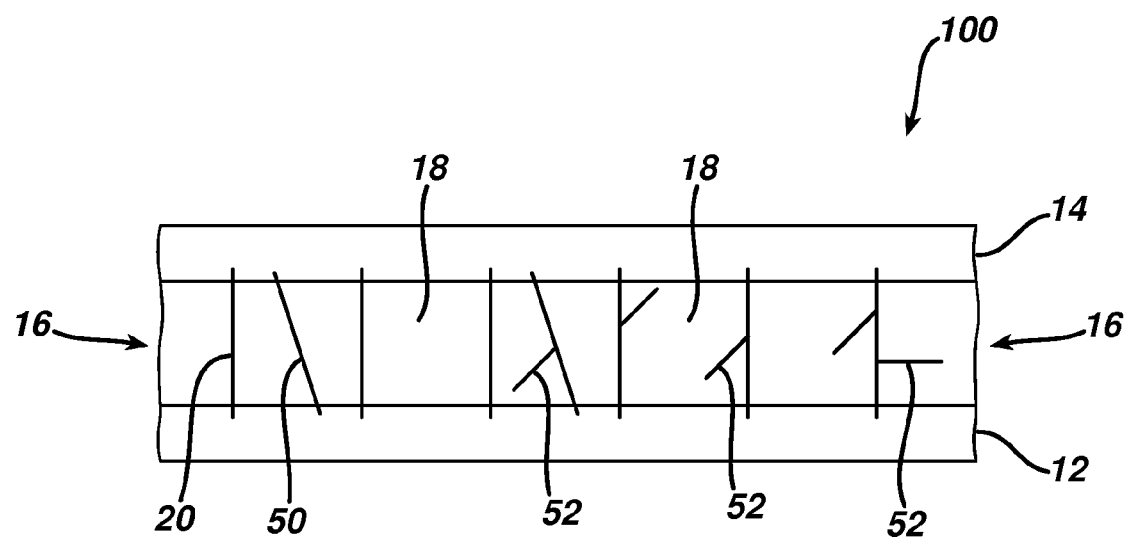
FIG. 3 schematically illustrates another exemplary embodiment of a z-directional fiber based reinforced composite.

FIG. 3 illustrates another embodiment of a single layer composite 100 having fibers 20 that are substantially perpendicular to each substrate 12, 14, as well as other fibers that are not substantially perpendicularly oriented. That is, the reinforcement zone 16 can include fibers 50 positioned at an angle to the substrates 12, 14. Additionally, the fibers 20, 50 can optionally include fiber branches 52 that can be oriented in a variety of directions. One skilled in the art will appreciate that the composite 100, having a reinforcement zone with non-perpendicular and/or branched fibers, can also be used to form multi-layered composites. Further, a multi-layered composite can include reinforcement zones having fibers that are all substantially perpendicularly oriented as well as reinforcement zones with fibers that are non-perpendicular (e.g., fibers having an oblique orientation angle distributed between about 45 degrees and about 135 degrees).

As indicated, various fiber/binder/substrate combinations can be modified to optimize their individual and combined properties to improve the properties and/or performance of the resulting composite. Thus, the composite can be fabricated by initially determining a set of desired properties and further selecting and/or modifying the fibers, binder resin, and/or substrate(s) in order to provide such properties. For example, in one exemplary embodiment, the fibers can be selected and/or modified to exhibit a surface resistivity of about $1\times10^5$ ohms to about $1\times10^9$ ohms. Such fibers can also be selected and/or modified to have an aspect ratio (length/diameter) in the range of about 100 to about 1000 or higher. Various other embodiments can utilize fibers of various other characteristics and/or properties in order to exhibit some desired composite performance.

In selecting an optimal fiber/binder combination, it is desirable for the composite to have an optimal bonding strength between the fibers and the binder resin. If the bonding strength between fiber and binder is too high, then the composite will delaminate at the fabric/binder interface as fibers will be broken and pulled out during crack growth. If the bonding strength is too low then the force and corresponding energy required for the fiber pull out will be small, therefore during the pull out there will be insufficient crack growth energy reduction.

Another useful property of the resulting composite is the flock fiber density (z-directional fibers per unit area of substrate). The flock fiber density is dependent upon fiber denier. For example, fibers of a diameter in the range of about 20 micrometers to about 50 micrometers have a optimum flock density of about 125 fibers/mm$^2$ to about 250 fibers/mm$^2$. However, fibers having diameters in the range of about 7 micrometers to about 10 micrometers have an optimum flock fiber density of about 200 fibers per mm$^2$ to about 800 fibers per mm$^2$. If the flock fiber density falls below the optimum density range for the particular fiber, the force and corresponding energy required to pull out the fibers will be relatively small during fiber pull-out resulting in insufficient crack growth energy reduction. However, if the fiber density is above the optimum range for the fiber, the force and corresponding energy required to pull out the fibers is nearly constant no matter how large the density is above the range, therefore fiber inclusion is wasted above this flock density range.

In addition to the properties described above (e.g., enhanced interlaminar strength and toughness), the composites can be optimized to exhibit a desired electrical and/or thermal conductivity. For example, as described in Example 5 below, the electrical conductivity of a composite can be optimized by varying the flock fiber density and length of the fiber. Also, by varying the fiber placement, fiber length, and/or flock fiber density of a composite, the thermal conductivity and the coefficient of thermal expansion of the composite can be optimized. For example, positioning z-directional copper fibers in a carbon or glass fabric/epoxy composite can increase the thermal conductivity and also increase the thickness of the composite as the temperature increases. Alternatively, positioning carbon fibers in a glass fabric composite can decrease the thickness of the composite as the temperature increases.

A method for fabricating a z-directional fiber based reinforced composite is also provided herein. In general, the method can include applying a binder matrix to at least one side of a substrate followed by delivery (e.g., flocking) of fibers to the substrate. As will be apparent to those skilled in the art, any of a number of delivery/flocking procedures can be utilized to deliver the fibers to the substrate. For example, the fibers can be delivered by a flocking procedure, such as electrostatic flocking, which serves to embed fibers in the first substrate. As known to those skilled in the art, electrostatic flocking utilizes an electrostatic field to orient and propel the fibers so that they can be embedded into the substrate in a desired orientation (e.g., substantially perpendicular). While virtually any such apparatus can be utilized, in an exemplary embodiment the electrostatic flocking apparatus is a Model HEK100 Flocking Unit Magg Flockmaschinen GmbH (Gomaringen, Germany). In another exemplary embodiment, the flocking procedure can apply a magnetic field to a plurality of magnetic nanoparticle fibers. The above-identified steps of applying the binder and flocking may be repeated several times to produce additional layers. Each time an additional layer is produced it is stacked upon previously formed layers until a composite with the desired number of layers is formed.

Following formation of the composite, pressure can be applied thereto until the desired thickness of the composite is attained. The pressure can additionally serve to embed the fibers in the second, adjacent substrate. As will be apparent to those skilled in the art, the desired pressure can be applied to the composite by a wide range of mechanisms. For example, pressure in the range of about 1 atmosphere to about 9 atmospheres can be applied to the composite by a platen press. In such an embodiment, the composite can be allowed to cure while still under pressure in the press. Curing, for example, can be performed overnight at room temperature. Following curing, the composite can undergo a post-cure treatment at about 80° C. for about 2 hours. In another embodiment, pressure can be applied to the composite using a vacuum bag. That is, the composite can be allowed to cure overnight at room temperature using a vacuum bag, followed by the post-cure treatment in an oven at about 80° C. for about 2 hours. Those skilled in the art will recognize that various methods of applying pressure and/or curing are within the spirit and scope of the present disclosure. Those skilled in the art will also appreciate that any or all of the various steps described above can be automated (e.g., in a continuous manufacturing process).

EXAMPLES

The following examples provide experimental data to further illustrate certain aspects of the present disclosure. These examples are in no way meant to limit or define the scope of any of the embodiments described above.

Example 1

The following experiment compared a non-flocked composite (no z-directional reinforcing fibers) versus composites having nylon (high density and low density) and composites having polyester (treated and untreated) z-directional reinforcing fibers. The reinforced composites utilized an epoxy having 100 parts Epon 826 (Shell Chemical Co., Houston, Tex.) mixed with 26 parts of Epicure 3223 curing agent (Shell Chemical Co.), in combination with a fiberglass substrate. The experiments were performed to illustrate that (1) composites with z-directional fibers exhibit higher fracture toughness as compared to non-flocked composites; and (2) z-directional reinforced fiber composites may be optimized to exhibit increased toughness by selecting higher flock density nylon fibers as compared to low density nylon fibers, as well as selecting treated polyester fibers (fibers treated as described in Example 3 below) as compared to untreated polyester fiber.

In short, the experiment showed:
the addition of z-directionally oriented fiber reinforcement in the form of nylon or polyester flock fibers (aspect ratio of about 200 to about 1000 or higher) produced a significant improvement in both Mode I and Mode II fracture toughness. An improvement of as high as about 7.57 times and about 3 times in Mode I and Mode II fracture toughness, respectively, was observed as compared to conventional non-flocked (no fibers) glass fabric/epoxy composites;

the in-plane properties, tensile, shear, and impact strength, were found to increase in response to the selection of various desired properties (i.e., selection of about 150-250 fibers/mm$^2$ flock density of nylon fiber and selection of about 20-85 fibers/mm$^2$ flock density of treated PET fiber); there was little degradation of these in-plane properties;

using the falling weight method, the impact resistance of flock-reinforced composites was found to be greatly improved as compared to convention glass fabric laminar composites. The higher density flock reinforcement showed the highest improvement of up to about 2.6 times the standard non-flocked composites; and, overall, experiments have shown that glass fabric/epoxy resin laminates that are z-directionally reinforced with nylon or polyester flock fibers show a significant improvement in delamination fracture toughness, as shown in Table 1 below:

TABLE 1

Mode I Fracture Toughness for Nylon and Polyester Fibers in Glass Fabric/Epoxy Resin Matrix Laminar Composite

| Composite | Control Non-Flocked | Low Density Nylon | High Density Nylon | Untreated Polyester | Treated Polyester |
|---|---|---|---|---|---|
| Fracture Toughness (KJ/m$^2$) | 0.35 | 1.25 | 2.65 | 1.75 | 2.5 |
| Improvement Factor Compared to the Ideal Non-Flocked | 1.0 | 3.57 | 7.57 | 5.0 | 7.14 |

Example 2

Figure 4:
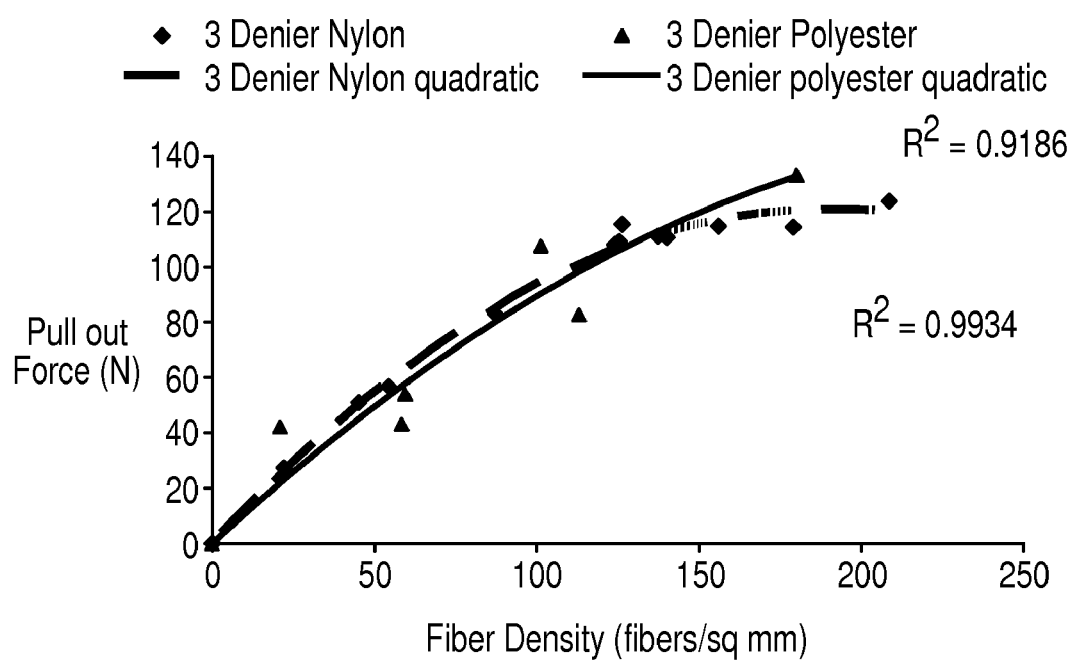
FIG. 4 is a graph showing pull-out force versus fiber density for various fiber types.

The following example illustrates selection of an optimum density range for a glass fiber, an amine cured epoxy matrix (Fiberglast Epoxy resin 2000/Cure 2060), and a 0.025 inch thick aluminum metal sheet substrate. FIG. 4 shows the results of an experiment wherein Nylon fiber's pull-out force is nearly constant at approximately 120 N for fiber densities greater than about 150 fibers/mm$^2$. As such, for the example illustrated in FIG. 4, the optimum fiber density for this 3 denier nylon fiber is about 150 to about 200 fibers/mm$^2$.

Example 3

In the following example it was shown that: (1) The addition of z-oriented fiber reinforcement in the form of (nylon) flock fibers (aspect ratio of about 1000 or higher) produced an improvement of as high as about 10 times the Mode I and about 3 times the Mode II fracture toughness as compared to conventional (not flocked in the z-direction) glass fabric/epoxy composites; (2) Z-direction reinforcement increased the tensile strength slightly for both the high and low density fibers; and, (3) Using the falling weight method, the impact resistance of flock-reinforced composites was found to be greatly improved as compared to conventional non-flocked glass fabric laminar composites. The higher density flock reinforcement showed the highest improvement of up to about 2.6 times the standard non-flocked composites. Overall, glass fabric/epoxy resin laminates that are z-directionally reinforced with thermoplastic nylon fibers show a significant improvement in delamination fracture toughness.

Figure 5:
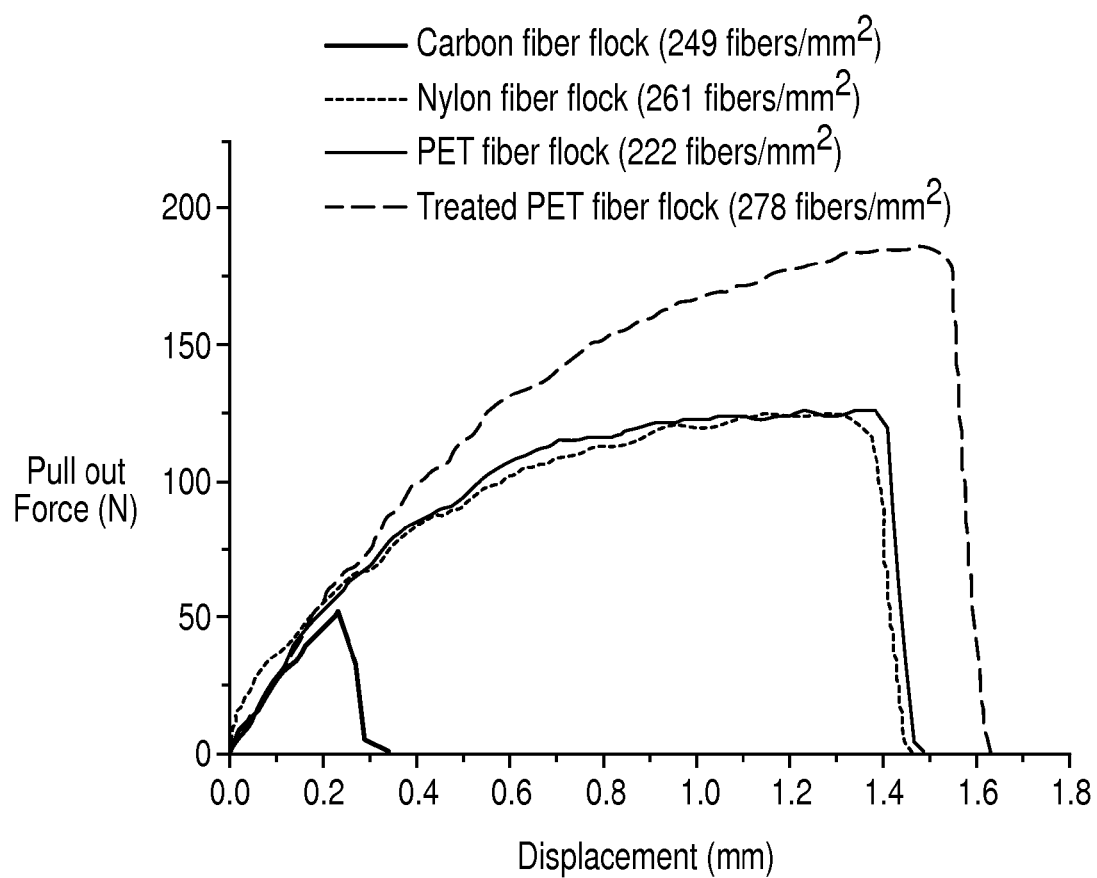
FIG. 5 is a graph showing pull-out force versus displacement for various fiber types.

Fiber pull-out tests were performed on flocked plates. The fibers were flocked to a plate with a thin epoxy resin layer (an amine cured epoxy matrix resin (Fiberglast Epoxy resin 2000/Cure 2060); the substrate was a 0.025 inch thick aluminum metal sheet of about 37 mm thickness, and the free ends were bonded to small disks using a hot melt adhesive. After the adhesive set, the specimens were pulled by a test apparatus. From these tests, typical force versus displacement curves were obtained for carbon, nylon, polyester ("PET"), and treated PET fiber samples at different densities, as shown in FIG. 5. The dissipation energy during fiber pull-out is proportional to the area under the curve.

Treated PET fibers were produced as follows:
Fiber material: 3 denier PET fibers.
Chemicals: Rainoff® SR-453 (Eastern Color and Chemical Company)—a hydrophobic surface treatment for PET fibers; Acetic acid (glacial)-pH control.
Procedure:
  Sample preparation—PET fibers are packed inside a cotton cloth pouch for the chemical treatment. The pouch is then sealed and weighed.
  Chemical bath preparation—Total amount of the liquor, consisting of the Rainoff® chemical and water, is calculated by multiplying the weight of the pouch by 30, which is the liquor to material ratio. The amount of Rainoff® chemical is about 0.5% of the weight of the flock fiber pouch.
  Mixing Process—Add calculated water and chemical addition to a bucket, using acetic acid to control the pH in the range of about 3.5 to about 5. Put the pouch containing fibers into the bucket and keep the temperature to about 55° C. The treatment is carried out for about 45 minutes with occasional stirring. Then the pouch is removed from the bucket and additional water is squeezed out by hand.
  Drying—After removal from the water, a hair dryer is used to dry the pouch from the outside; flock fibers are transferred from the cotton cloth pouch to the polyester cloth pouch; the pouch is then dried in oven for 3 days at about 80° C.

FIG. 5 shows that untreated nylon and polyester (PET) flock fibers behave quite similarly in their fiber pull-out force/strength tests. Pull out force is indicative of the degree of adhesion between the flock fiber and the epoxy resin polymer into which the fiber is imbedded (i.e., bonded). Treated PET flock fibers show the highest fiber pull-out force/strength among all fibers tested.

Figure 6:
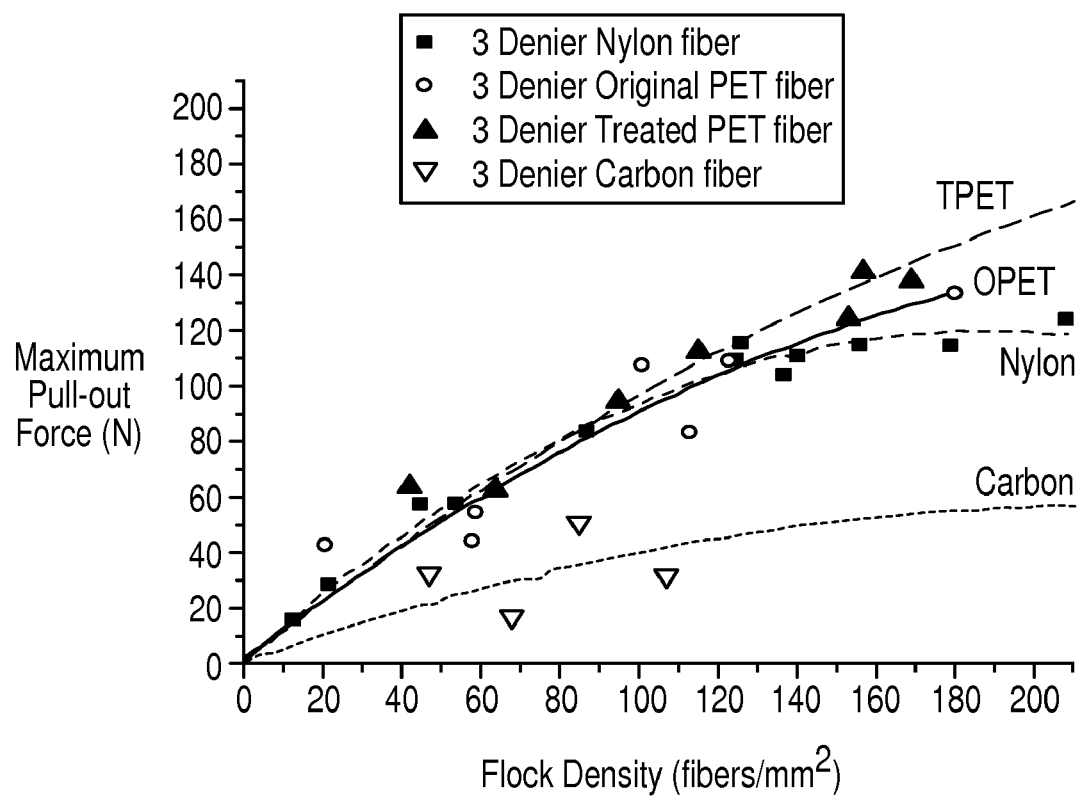
FIG. 6 is a graph showing pull-out force versus flock density for various fiber types.

Using the data from the pull-out tests, the relationship between flock density and max pull-out force was obtained and shown in FIG. 6 as a plot of fiber pull-out force and flock density. Overall, the nylon, PET and treated PET flock fibers behave quite similarly. The pull-out force for these flock fibers are maximized at a flock density of about 140 to about 160 flock fibers per square millimeter of substrate surface.

Figure 7:
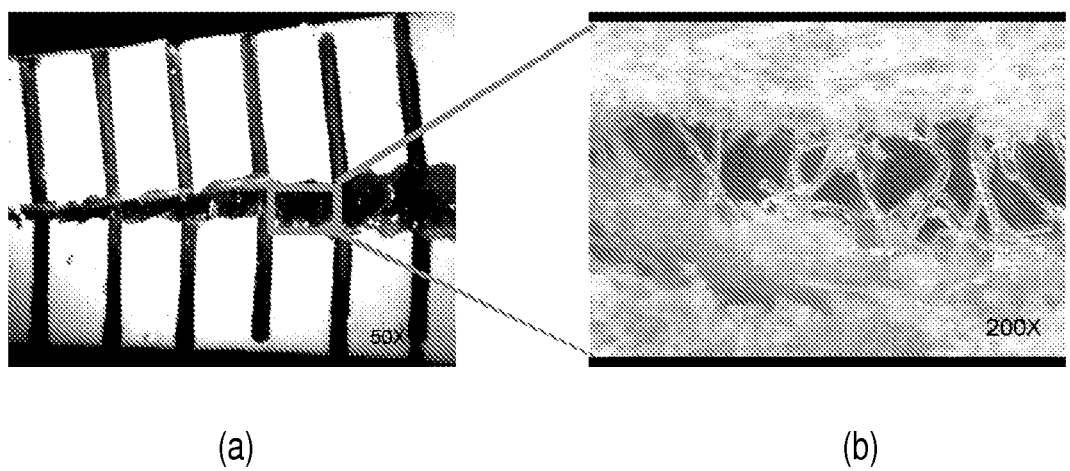
FIG. 7A shows a crack tip resulting from a Double Cantilever Beam ("DCB") test.
FIG. 7B is a magnified view of fiber bridging near the crack tip as shown in FIG. 7A.
Figure 8:
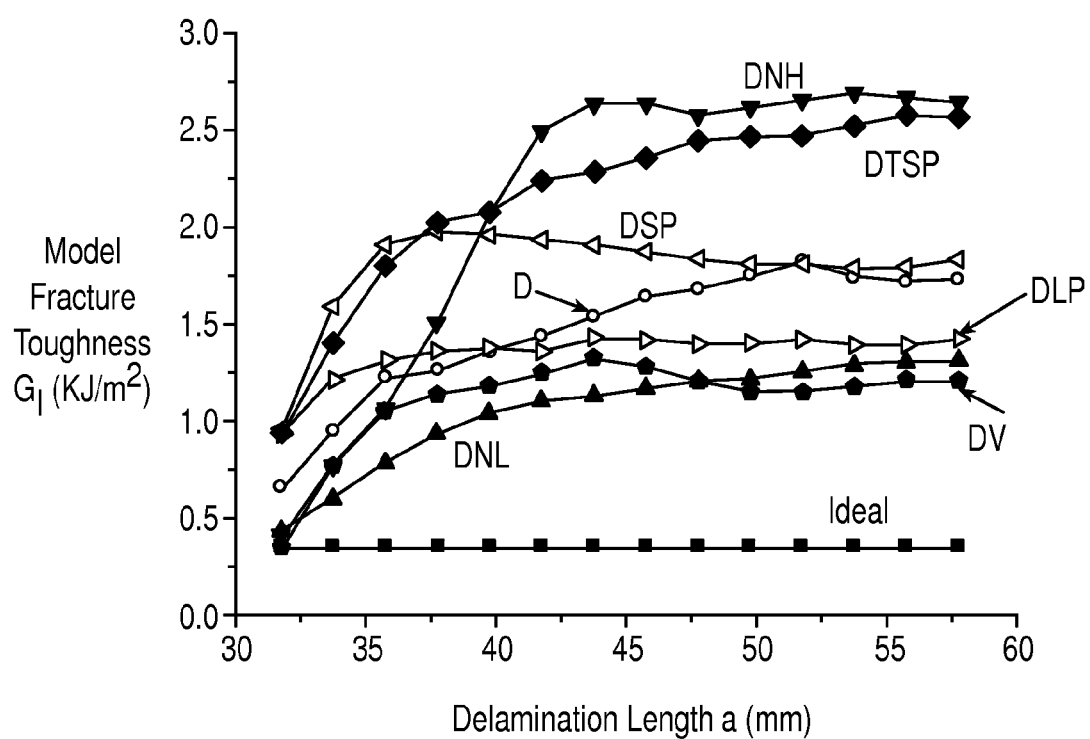
FIG. 8 is a graph showing model fracture toughness versus delamination length for various fiber types.

Double Cantilever Beam ("DCB") tests were used in Mode I fracture toughness tests. For illustrative purposes, FIG. 7A shows a crack tip and FIG. 7B shows fiber bridging near the crack tip. Fracture toughness versus delamination length curves were plotted from the data of the DCB tests for various fibers. These test results are shown in FIG. 8 and the data is also transposed into Table 2 below to more clearly represent the merits of z-direction flocked laminar composites in increasing the interlaminar shear strength of laminar composites.

TABLE 2

Mode I Fracture Toughness of Various Laminar Composites

| Flock Material | Special Treatment | Average Flock Density (fibers/mm$^2$) | Fracture Toughness (KJ/m$^2$) |
|---|---|---|---|
| "D"-Non-flocked glass fabric laminar composite | Fabricated in a Flat Press | Not Flocked | 1.70 |
| "DV"-Non-flocked glass fabric laminar composite | Fabricated By Vacuum Bag Process (pressure is unknown but estimated to be about 0.9 atm) | Not Flocked | 1.18 |
| "DNL"-Glass Fabric Laminar Composite (Low Flock Density) | With 3 denier Nylon Flock; 1.2 mm in length. Flat Press approx. 140 psi | 43 | 1.31 |
| "DNH"-Glass Fabric Laminar Composite (High Flock Density) | With 3 denier Nylon Flock; 1.2 mm in length. Flat Press approx. 140 psi | 170 | 2.67 |
| "DSP"-Glass Fabric Laminar Composite | With 3 denier PET flock fibers; 0.6 mm in length. Flat Press approx. 140 psi | 502 | 1.76 |
| "DLP"-Glass fabric laminar composite | With 3 denier PET flock fibers, 1.2 mm length; Flat Press approx. 140 psi | 170 | 1.45 |
| "DTSP"-Glass fabric laminar composite | With TREATED 3 denier PET flocked fabric, 0.6 mm length; Flat Press approx. 140 psi | 248 | 2.60 |
| "Ideal" Glass Fabric Laminar Composite Control | Not Flocked Control "Ideal Sample" | No Flock | 0.35 |

Overall, the Nylon and Treated PET fiber flocked glass fabric laminar composites were found to have the highest Fracture Toughness (interlaminar shear strength) among the composites tested. The un-flocked laminates and the controls have a fracture toughness that is only half the fracture toughness of these z-reinforced composites.

Finite Element Modeling

Figure 9:
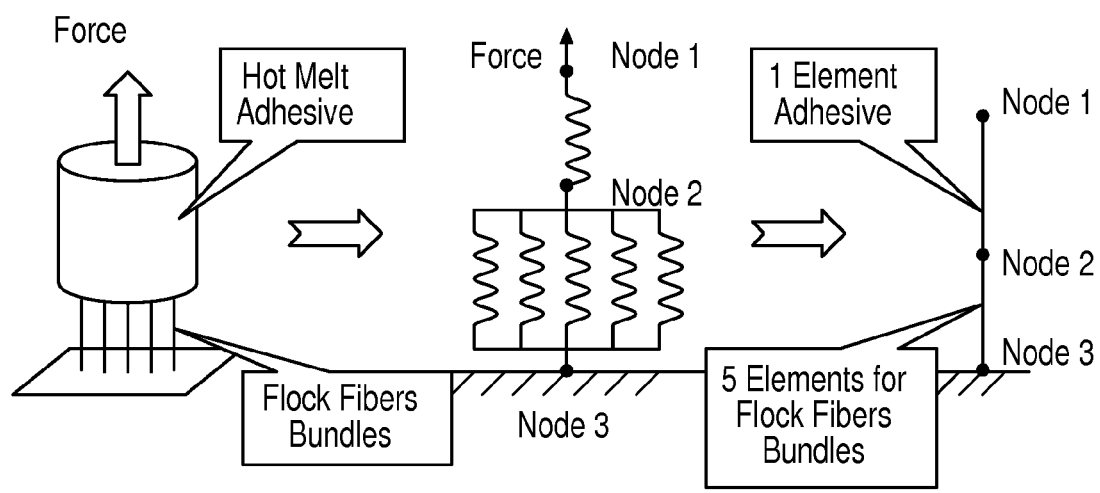
FIG. 9 shows an overview of finite element modeling for a composite.
Figure 10:
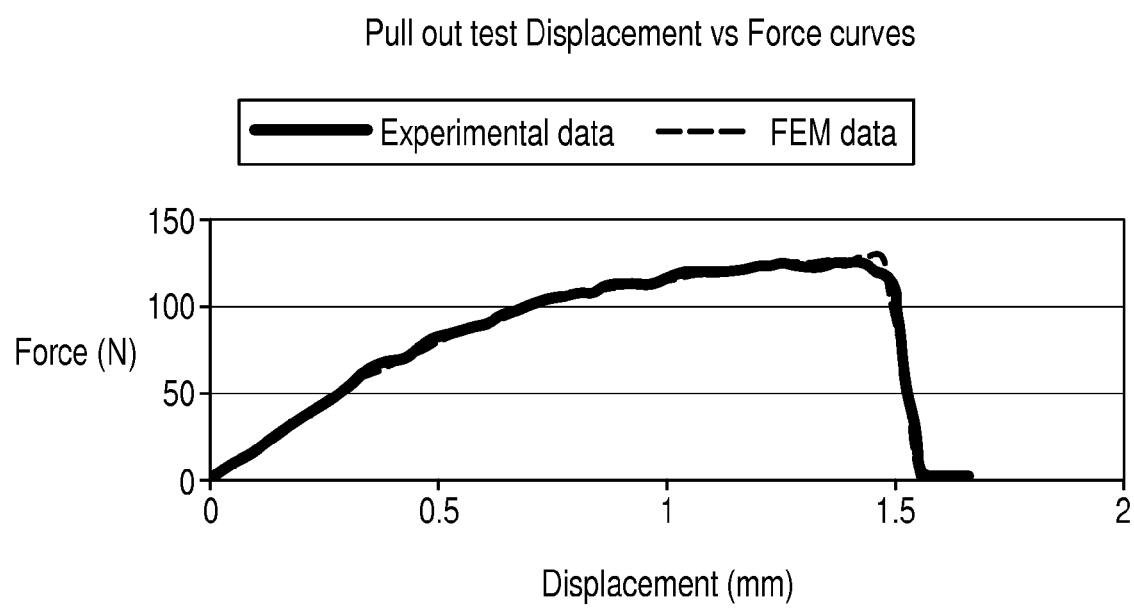
FIG. 10 is a graph comparing finite element modeled data and actual pull-out force versus displacement data.

A finite element model of fiber pull-out was developed for the finite element macromodel of the composite. FIG. 9 demonstrates how pull-out test was modeled using the finite element method. The fibers were modeled using spring-slider elements. A "breakaway" feature is available to allow the element stiffness to drop to about zero once a limiting force has been reached, which simulates the fiber bundles being pulled out. The FE model fits the experimental data for the pull-out test very well, as shown in FIG. 10 by a typical comparison of the FE model and the pull-out curve for a high density nylon sample.

For the finite element study, the energy release rate, which is the change of strain energy required to open new crack areas, can be calculated from equation (1) below:

$$G = (1/t)(dU/da) = (1/t)((U_{a+\Delta a} - U_a)/\Delta a) \quad \text{Equation (1)}$$

where t is the width of the composite model. In the finite element model, the "virtual crack extension method" is used, which calculates G as the crack opens, starting at a crack length of "a" and increasing a small increment, Δa. In this method the strain energy is calculated at both crack states, $U_a$ and $U_{a+\Delta a}$. Next, the discretized formula of Equation (1) is used to calculate the energy release rate.

Figure 11:
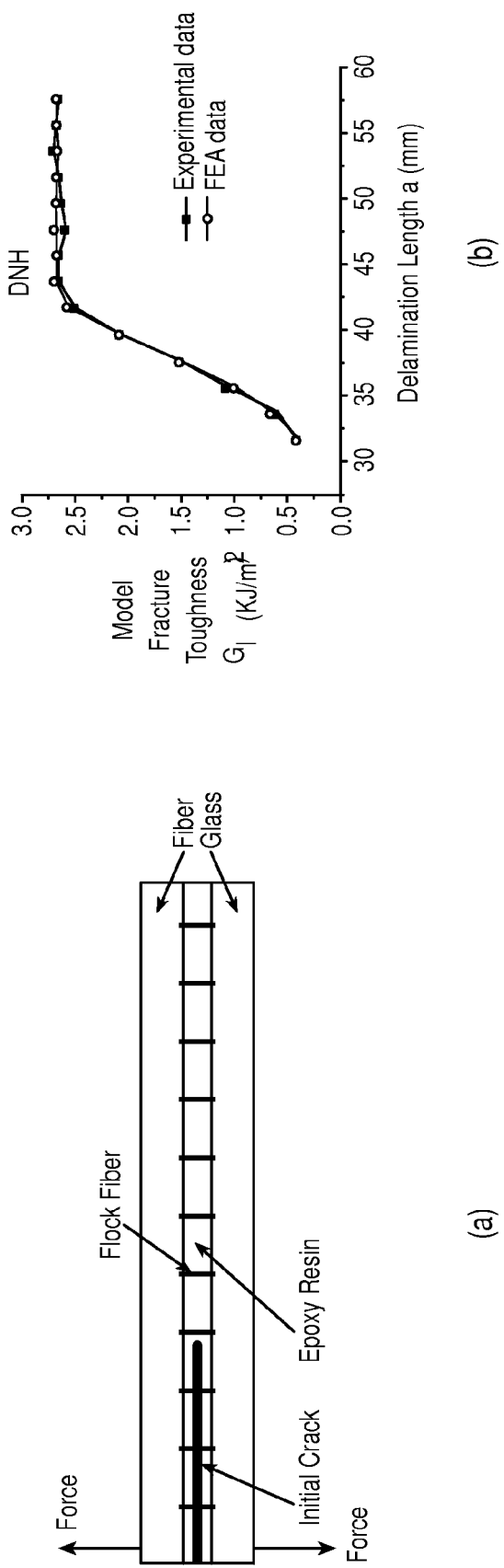
FIG. 11A shows a DCB fracture model.
FIG. 11B is a graph comparing finite element modeled data and actual model-fracture toughness versus delamination length data.

A finite element analysis was performed to model the Mode I failure mechanism and fracture toughness in a Double Cantilever Beam (DCB) test by using a 3-D symmetric finite element model with composite and spring-slider elements, as shown in FIG. 11A. The finite element model showed that the delamination resistance increases from the energy consumption by pull-out and/or breaks of the z-directional reinforcement fibers. The model and result for z-reinforcement of about 1.3 mm-3 denier nylon fibers at about 200 fibers per mm$^2$ are shown in FIG. 11B. The result shows that the Mode I toughness of the z-reinforced laminar laminar composites can be explained by the fiber pulling and bridging mechanisms.

Conclusions:

The following conclusion may be drawn from this example: (1) Because the multi-fiber pull-out test reflects the effect of the interaction of adjacent fibers and their surrounding epoxy resin, compared with the single fiber pull-out test, the multi-finer pull test is a better way to model local flock fiber behavior during fiber bridging in a DCB test; (2) The multi-finer pull out test shows that the maximum pull out force is a quadratic function of the fiber density. The maximum force reaches nearly a constant at some specified fiber density depending of the type of the fiber. This means that to obtain the highest fracture toughness of the flock fiber reinforced composite, the optimum density should be applied; (3) Studies on the multi-fiber, pull-out test shows that fibers with different embedded angles have a different debonding force. So with the increase of the displacement, fibers with the same embedded angles will debond simultaneously while flock fibers with different embedded angles will debond at different times. A finite element model is built based on this concept and the computational results agree well with the experimental data; (4) The presence of the z-direction flock fiber reinforcement will improve the mode I fracture toughness as high as about 7 times compared to the ideal non-flocked laminate; (5) For the samples tested, increasing the flock density will improve the mode I fracture toughness up to a point. Different flock fibers will yield different toughnesses; (6) The tensile strength of flocked composite samples is improved up to about 1.66 times compared to the non-flock composite samples, while there is little difference between the Young's Modulus of the flocked and non-flocked composites. The Poisson's ratios of these composites are around about 0.3; (7) There is no significant difference in the in-plane shear strength between the 3 denier nylon flocked composite and the non-flocked composites; and (8) The DCB test is modeled using a 2D finite element model. A softening linear bridging law is used to simulate the behavior of the flocked fibers. The computational results prove this model is suitable to simulate the mode I fracture toughness in flock fiber reinforced composites. The FE model also confirms that the fracture toughness is a function of the fiber pull-out stiffness and fiber bridging length.

Example 4

Figure 12:
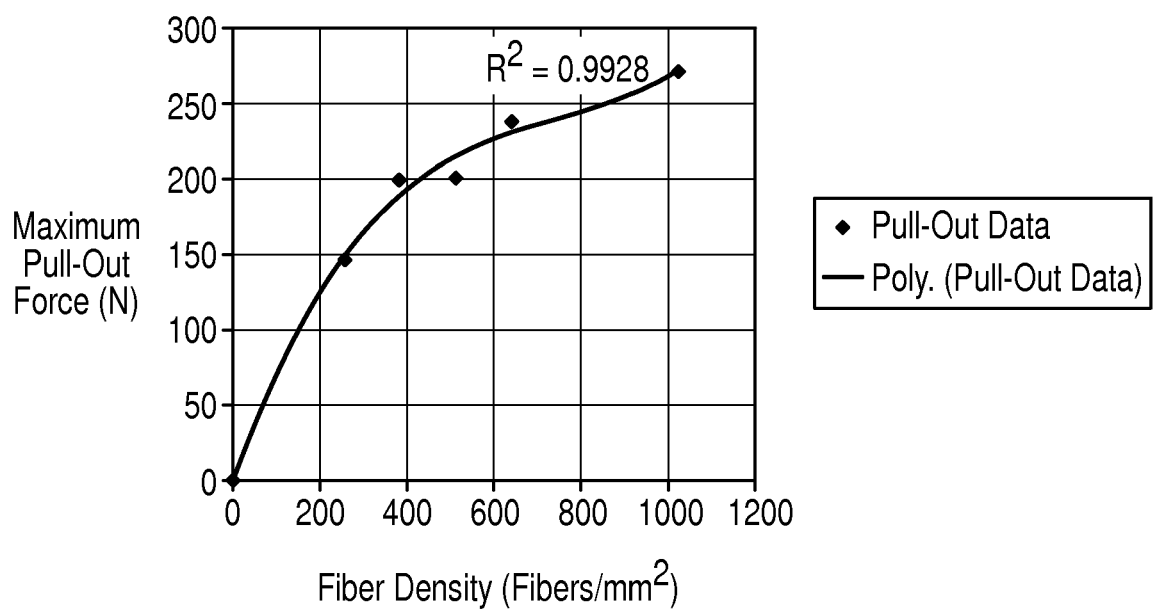
FIG. 12 is a graph showing maximum pull-out force versus fiber density for a high strength carbon fiber.

Experiments were conducted on carbon fibers of about 0.5 mm in length and about 7 µm in diameter in order to determine the maximum pull-out force at several different fiber densities. An amine cured epoxy matrix resin (Fiberglast Epoxy resin 2000/Cure 2060) was used. The substrate was a 0.025" thick aluminum metal sheet. The carbon fiber (flock) used here was fiber Type A534 Carbon Fiber (unsized) from Fiber Technologies, Stratford, Conn. The results of these tests are shown in Table 3 below and plotted in FIG. 12:

TABLE 3

Pull-out Data for 0.5 mm Carbon Fiber

| Fiber Density (Fibers/mm$^2$) | Maximum Pull-Out Force (N) |
|---|---|
| 0 | 0 |
| 257 | 147 |
| 385 | 199 |
| 513 | 201 |
| 642 | 237 |
| 1025 | 271 |

In addition to these results, it was observed that not all carbon fibers yield the same results. High strength carbon fiber has a higher pull-out force compared to high modulus carbon fiber, which is brittle. These results indicate the potential to optimize fiber density (fibers/mm$^2$ of substrate) of high strength carbon fibers for use in presently disclosed z-directional reinforced composites.

Example 5

An electrical conductivity parameter study was conducted to study the effect that varying the fiber density of z-directional carbon fibers had on a carbon pre-preg composite. The z-directional carbon fiber was an un-sized type T-300 carbon fiber with a diameter of 7 micrometers (µm) and a fiber material density of 1.8 g/cm$^3$. The pre-preg was a carbon fabric/epoxy pre-preg material (CYCOM 934).

A typical composite was fabricated by laying up an 8 ply quasi-isotropic laminates composed of a 0/90/+45/−45/−45/+45/90/0 layering of the pre-preg plies with flocked fiber in between each layer. Four composite panels were fabricated and their flock density ranges are shown in Table 4.

TABLE 4

Composite Flock Density

| Carbon Fabric Laminate | Low Flock Density | Flock Density (fibers/mm$^2$) | High Flock Density | Flock Density (fibers/mm$^2$) |
|---|---|---|---|---|
| 0.5 mm | LFD | 1600 to 1900 | HFD | 2600 to 3200 |
| 1.0 mm | LFD | 800 to 900 | HFD | 1300 to 1400 |

2.54×2.54 cm specimens were cut from the composites, one for each of four configurations: (1) 0.5 mm low density, (2) 0.5 mm high density, (3) 11.0 mm low density, and (4) 1.0 mm high density. The resistance of each specimen was measured using a multimeter equipped with probes. The multimeter probes were place on the top and bottom of the specimens in order to determine the resistance through the composite layers. Six measurements were taken for each specimen and an average and +/−standard deviation was calculated. The results of this experiment are shown in Table 5.

TABLE 5

Resistance Measurement for Various Test Samples

| | Ave Electrical Resistance (Ohm) | Thickness (cm) |
|---|---|---|
| NF | 42.85 +/− 0.354 | 0.1422 |
| 0.5 mm LD | 25.15 +/− 0.0707 | 0.241 |

TABLE 5-continued

Resistance Measurement for Various Test Samples

|  | Ave Electrical Resistance (Ohm) | Thickness (cm) |
|---|---|---|
| 0.5 mm HD | 21.55 +/− 0.212 | 0.394 |
| 1.0 mm LD | 27.55 +/− 0.0707 | 0.218 |
| 1.0 mm HD | 28.2 +/− 0.707 | 0.31 |

The addition of z-directionally oriented fiber reinforcement in the form of carbon flock fibers produced a significant improvement in electrical conductivity. An improvement of as high as about 5.5 times, as shown in Table 6.

TABLE 6

Specific Electrical Conductivity for Carbon Fibers in a Carbon Fabric/Epoxy Resin Matrix Laminar Composite

| Composite | Control Non-Flocked | Low Density 0.5 mm | Low Density 1 mm | High Density 0.5 mm | High Density 1 mm |
|---|---|---|---|---|---|
| Conductivity (ohm-cm)$^{-1}$ | 0.000515 | 0.001487 | 0.001229 | 0.00283 | 0.001704 |
| Improvement Factor Compared to the Non-Flocked Composite | 1.0 | 2.89 | 2.39 | 5.51 | 3.31 |

One skilled in the art will appreciate further features and advantages of the present disclosure based on the above-described embodiments. Accordingly, the present disclosure is not to be limited by what has been particularly shown and described, except as indicated by the appended claims. All publications and references cited herein are expressly incorporated herein by reference in their entirety.

What is claimed is:

1. A composite, comprising:
   a plurality of substrates; and
   a reinforcement zone disposed between adjacent substrates of the plurality of substrates, the reinforcement zone having a binder resin and a plurality of fibers, a majority of which are oriented substantially perpendicular to the substrates, the substantially perpendicularly oriented fibers spanning adjacent substrate layers and being embedded in the adjacent substrate layers,
   wherein the reinforcement zone further comprises a plurality of fibers oriented at a non-orthogonal angle to the plurality of substrates and a plurality of branched fibers, each branched fiber extending from one of the plurality of fibers oriented substantially perpendicular to the substrates or from one of the plurality of fibers oriented at a non-orthogonal angle to the plurality of substrates.

2. The composite of claim 1, wherein the binder is an epoxy.

3. The composite of claim 1, wherein one or more of the perpendicularly oriented fibers, the fibers oriented at a non-orthogonal angle, and the branched fibers have an average denier of about 1.5 to about 25.

4. The composite of claim 1, wherein one or more of the perpendicularly oriented fibers, the fibers oriented at a non-orthogonal angle, and the branched fibers have an average length is about 0.5 mm to about 5 mm.

5. The composite of claim 1, wherein the fibers are dispersed in the reinforcement zone at a fiber density in the range of about 50 fibers/mm$^2$ to about 600 fibers/mm$^2$.

6. The composite of claim 5, wherein a plurality of one or more of the perpendicularly oriented fibers, the fibers oriented at a non-orthogonal angle, and the branched fibers have a diameter in the range of about 7 micrometers to about 50 micrometers.

7. The composite of claim 1, wherein a plurality of one or more of the perpendicularly oriented fibers, the fibers oriented at a non-orthogonal angle, and the branched fibers are selected from a group consisting of polymer-based fibers, glass fibers, carbon fibers, natural fibers, and metal fibers.

8. The composite of claim 1, wherein one or more of the perpendicularly oriented fibers, the fibers oriented at a non-orthogonal angle, and the branched fibers comprise a surface treatment.

9. The composite of claim 8, wherein the surface treatment is selected from a group consisting of an electrical activity processing agent and an adhesion agent.

10. The composite of claim 1, wherein one or more of the perpendicularly oriented fibers, the fibers oriented at a non-orthogonal angle, and branched fibers comprise nanoparticles having a magnetic component.

11. The composite of claim 1, wherein the fibers are dispersed in the reinforcement zone at a fiber density in the range of about 125 fibers/mm$^2$ to about 250 fibers/mm$^2$.

12. A composite, comprising:
   a first substrate parallel to a second substrate, at least one of the first and second substrates being a pre-preg having a binder resin incorporated therein;
   a plurality of fibers having at least a portion thereof disposed within the binder resin, a majority of the fibers being oriented substantially perpendicular to the substrates, the substantially perpendicularly oriented fibers spanning the first and second substrate layers and being embedded in the first and second substrate layers; and
   a plurality of branched fibers, each branched fiber extending from one of the plurality of fibers, at least some of the plurality of branched fibers being disposed substantially parallel to the substrate.

13. The composite of claim 12, wherein the binder resin is an epoxy.

14. The composite of claim 13, wherein the epoxy is configured to begin as a b-staged epoxy.

15. The composite of claim 12, wherein the fibers are dispersed in the reinforcement zone at a fiber density in the range of about 125 fibers/mm$^2$ to about 250 fibers/mm$^2$.

* * * * *

UNITED STATES PATENT AND TRADEMARK OFFICE
CERTIFICATE OF CORRECTION

PATENT NO. : 7,981,495 B2
APPLICATION NO. : 11/931416
DATED : July 19, 2011
INVENTOR(S) : Yong K. Kim, Armand F. Lewis and John M. Rice Page 1 of 1

It is certified that error appears in the above-identified patent and that said Letters Patent is hereby corrected as shown below:

On the Title Page:

Item (73), change:

"Assignees: Invensys Systems, Inc., Foxboro, MA (US); University of Massachusetts, Worcester, MA (US)"

to

Item (73) "Assignee: University of Massachusetts, Worcester, MA (US)"

Signed and Sealed this
Twenty-seventh Day of March, 2012

David J. Kappos
*Director of the United States Patent and Trademark Office*